US007296284B1

(12) United States Patent
Price et al.

(10) Patent No.: US 7,296,284 B1
(45) Date of Patent: Nov. 13, 2007

(54) CLIENT TERMINAL FOR DISPLAYING RANKED PROGRAM LISTINGS BASED UPON A SELECTED RATING SOURCE

(75) Inventors: William P. Price, Santa Ana, CA (US);
R. Gregory Kalsow, Lake Forest, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 1221 days.

(21) Appl. No.: 09/944,652

(22) Filed: Aug. 31, 2001

(51) Int. Cl.
*G06F 3/00* (2006.01)
*G06F 13/00* (2006.01)
*H04N 5/445* (2006.01)

(52) U.S. Cl. .............................. 725/39; 725/24; 725/44; 725/46; 725/48; 348/563

(58) Field of Classification Search .................. 725/39, 725/44–48, 59, 24; 348/563
See application file for complete search history.

(56) References Cited

U.S. PATENT DOCUMENTS 5,758,259 A * 5/1998 Lawler ........................ 725/45
5,808,608 A * 9/1998 Young et al. ................. 725/52
6,317,881 B1 * 11/2001 Shah-Nazaroff et al. ...... 725/24

* cited by examiner

*Primary Examiner*—Chris Kelley
*Assistant Examiner*—Joseph G Ustaris
(74) *Attorney, Agent, or Firm*—Blakely, Sokoloff, Taylor & Zafman

(57) ABSTRACT

Disclosed is a client terminal connectable to a video distribution system (VDS) and a display device. The client terminal includes a VDS interface to receive program guide information and program rating data from the VDS, a display interface to display a program guide on the display device, a user interface to receive user input, a local memory to store a ranking program, and a terminal controller responsive to the user interface and the ranking program. The terminal controller responsive to the user interface and the ranking program: allows the user to select a rating source from a list of rating sources displayed on the display device, via user input; ranks the program listings based upon program rating data associated with the selected rating source; and displays the ranked program listings in the program guide on the display device.

30 Claims, 4 Drawing Sheets

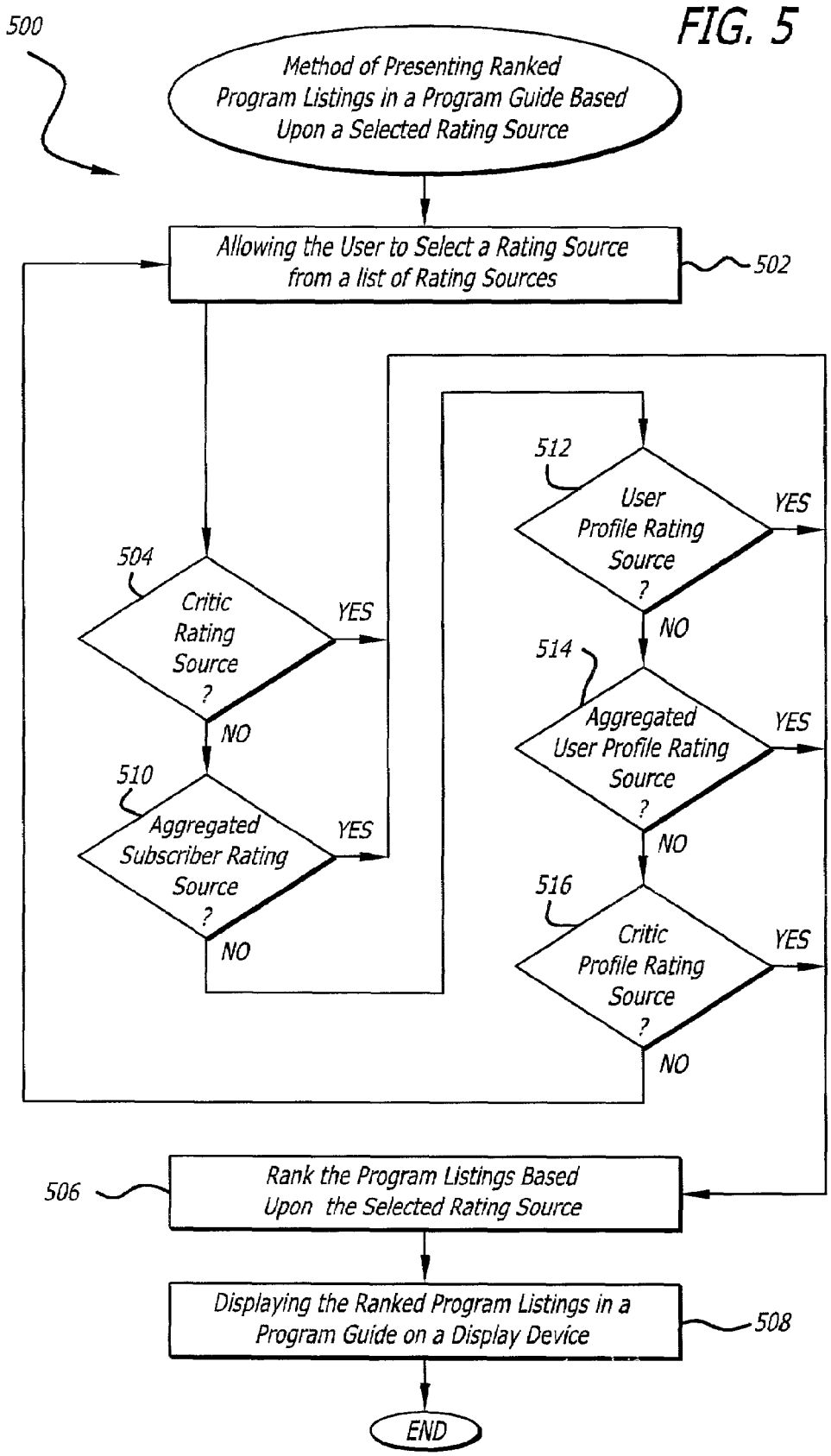

CLIENT TERMINAL FOR DISPLAYING RANKED PROGRAM LISTINGS BASED UPON A SELECTED RATING SOURCE

BACKGROUND OF THE INVENTION

1. Field of the Invention

The present invention relates to the field of communication systems. More particularly, the present invention relates to a client terminal that provides for displaying ranked program listings in a program guide based upon a selected rating source.

2. Description of the Prior Art

Video program providers, such as cable and satellite networks, offer tiered levels of service to a user. These tiered levels of service include many different channels, offering a variety of television programs and movie to users. Typically, there are basic tiers, expanded basic tiers, and premium tiers. The basic tier level of service usually includes "must carry" and retransmission channels known as broadcast network channels, e.g., ABC, NBC, CBS, etc. The expanded basic tier includes the basic tier channels and an aggregation of cable or satellite channels, e.g., USA, FOX, TNT, MTV, VH1, etc. Video program providers also offer a variety of premium tiers, in addition to the basic tier or the expanded basic tier, that include "premium channels," such as HOME BOX OFFICE (HBO), SHOWTIME (SHO), CINEMAX (CMAX), STARZ, ENCORE (ENC) etc. Premium channels typically offer video programming that is not available from the basic tier channels and the expanded basic tier channels, such as newly released movies.

Typically, the channels are listed in an on-screen program guide on the user's display device (e.g. a television set). On-screen program guides usually display a listing of channels, typically in numerical order (based on the channel position and the channel call sign of the video transmission system), and the titles of the programs being broadcasted or to be broadcasted on the channels. These on-screen program guides typically show the user the list of channels and corresponding programs in a fixed grid format for an interval of time displayed in a horizontal direction across the screen. The program guide usually scrolls automatically in a vertical direction in an analog environment. In a digital environment, in which a client terminal or a set-top box is utilized, the user has the ability to provide feedback to the client terminal or set-top box to cause associated software to perform various actions in the presentation of the program guide. For example, in the digital environment, the program guide can be manually scrolled (vertically and horizontally) via user input. Furthermore, the viewer has the ability to alter the time period or slot for which the listings are being presented and also has the ability to alter the listing format such that the listings can be sorted by channel, subject, actor, and many other variables.

Presently, many people spend time watching program content reviewers such as television and movie critics (e.g. Ebert & Roeper) who rate movies and television programs. Alternatively, many people read movie and television reviews in newspapers and printed television guides. Oftentimes, people base what programs they view solely on the judgment of one or more favorite reviewers. Thus, many people select a particular rating source upon which to base their program selections. Unfortunately, presently, there is no way to integrate a particular rating source, such as a critic's review of programs (e.g. television and movies), with today's programming guides.

There is, therefore, the need to provide techniques to present programs in a program guide that are ranked and ordered based upon a selected rating source, such as the recommendations of a critic.

SUMMARY OF THE INVENTION

The present invention may be regarded as a client terminal connectable to a video distribution system and a display device. The video distribution system provides program guide information to the client terminal to create a program guide that includes program listings and provides program rating data to the client terminal that is associated with rating sources.

The client terminal includes a video distribution system interface to receive the program guide information and the program rating data, a display interface to display the program guide on the display device, a user interface to receive user input, a local memory to store a ranking program and a terminal controller responsive to the user interface and the ranking program. The terminal controller responsive to the user interface and the ranking program allows the user to select a rating source from a list of rating sources displayed on the display device, via user input. Furthermore, the terminal controller responsive to the ranking program ranks the program listings based upon program rating data associated with the selected rating source and displays the ranked program listings in the program guide on the display device.

The present invention may also be regarded as a computer program embodied in a computer readable storage medium for use in the client terminal. The computer program comprises code segments for allowing the user to select a rating source from a list of rating sources displayed on the display device, via user input. Furthermore, the computer program comprises code segments for: ranking program listings based upon program rating data associated with the selected rating source and displaying the ranked program listings in the program guide on the display device.

The present invention may further be regarded as method for presenting ranked program listings in a program guide based upon a selected rating source. A user is allowed to select a rating source from a list of rating sources displayed on a display device via user input. The program listings are ranked based upon program rating data associated with the selected rating source and the ranked program listings are displayed in the program guide on the display device.

BRIEF DESCRIPTION OF THE DRAWINGS

FIG. 4 is a flow diagram according to one embodiment of the present invention.

FIG. 5 is a more detailed flow diagram according to one embodiment of the present invention.

DESCRIPTION OF THE PREFERRED EMBODIMENTS

Figure 1:
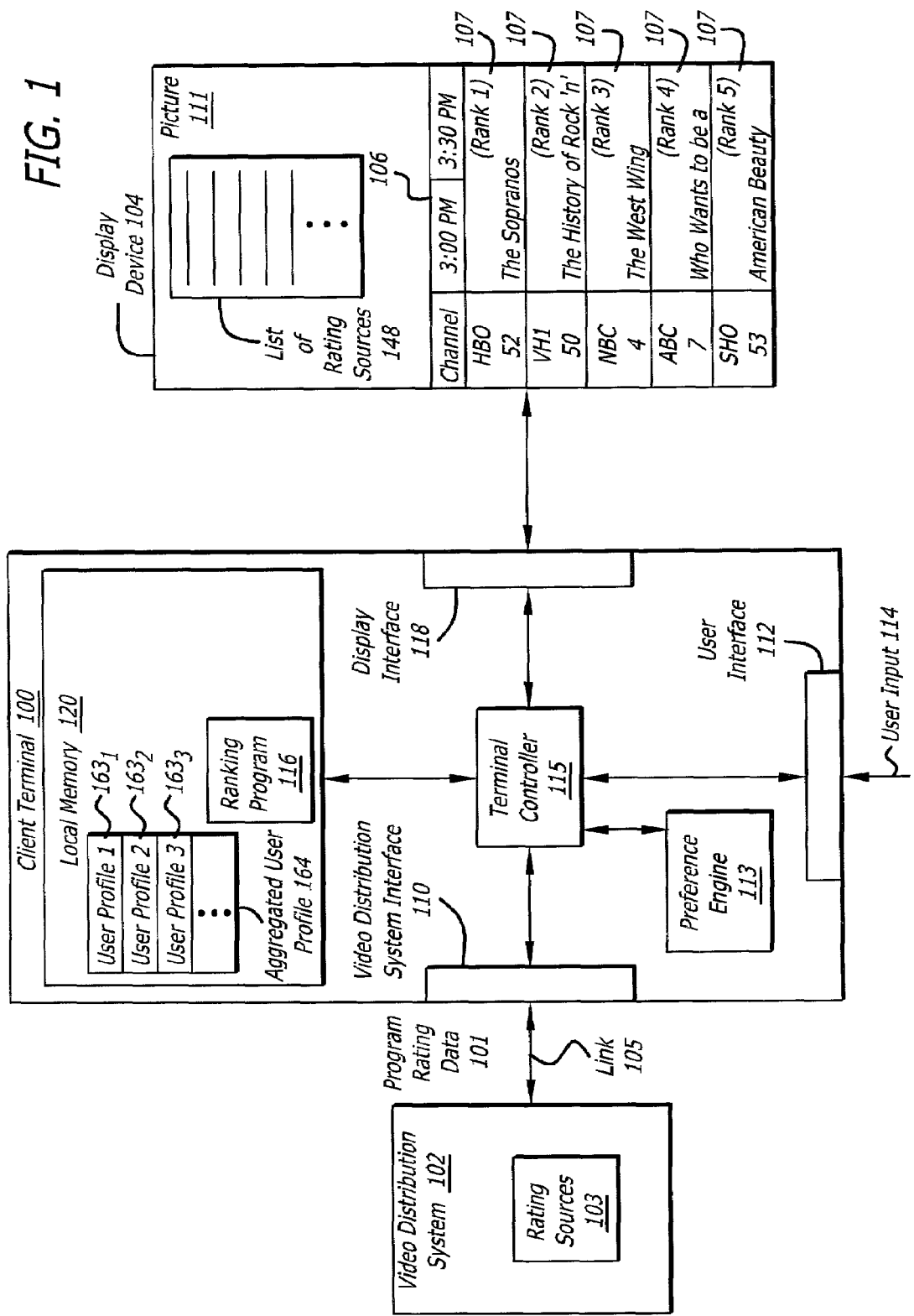
FIG. 1 shows a client terminal, connected to a video distribution system and a display device, that provides for displaying ranked program listings in a program guide based upon a selected rating source, according to one embodiment of the present invention.

FIG. 1 shows a client terminal 100, connected to a video distribution system 102 and a display device 104, that provides for displaying ranked program listings in a program guide 106 based upon a selected rating source, according to one embodiment of the present invention. The video distribution system 102 provides program guide information and program rating data 101 that is associated with rating sources 103 to the client terminal 100 through a link 105, as well as video programs. The program guide information is used by the client terminal 100 to create a program guide 106 that includes program listings 107. The program rating data 101 that is associated with rating sources is used by the client terminal 100 to rank program listings for display in the program guide 106. However, in some embodiments, the program rating data is generated at the client terminal 100 for ranking program listings 107, as will be discussed.

The client terminal 100 includes a video distribution system interface 110 to receive the program guide information and the program rating data 101, a display interface 118 to display the program guide 106 on the display device 104, a user interface 112 to receive user input 114, a local memory 120 to store a ranking program 116, and a terminal controller 115 responsive to the user interface 112 and the ranking program 116. The terminal controller 115 responsive to the user interface 112 and the ranking program 116 allows the user to select a rating source from a list of rating sources 148 displayed on the display device 104, via user input 114. Furthermore, the terminal controller 115 responsive to the ranking program 116 ranks the program listings 107 based upon program rating data associated with the selected rating source and displays the ranked program listings 107 in the program guide 106 on the display device 104. Thus, program listings 107 can be presented in a program guide 106 that are ranked and ordered based upon a selected rating source from a list of rating sources 148.

The video distribution system 102 can be a cable head-end, a satellite head-end, a terrestrial broadcast head-end, a multiple-service operator (MSO), a computer server head-end, or any combination thereof, that is capable of broadcasting the program guide information, program rating data 101, and video programs. The display device 104 is typically a television, computer monitor, or any other sort of display device.

The program guide information and the program rating data 101 can be transmitted from the video distribution system 102 to the client terminal 100 across link 105 in any type of data format designed to transfer data such as concatenated data, packetized data, associated database sets of attributes, etc. As shown in FIG. 1, an example of a program guide 106 is illustrated. The program guide 106 created by the client terminal 100 for display on the display device 104 may show the user a list of channels and corresponding programs listings 107 in a fixed grid format. However, it should be appreciated that a variety of different program guide formats could be utilized. In one embodiment of the invention, the program guide 106 includes program listings 107 for channels that appear in a ranked order based upon user selection of a rating source from a list of rating sources 148. Alternatively, the program guide 106 can display a listing of channels in a typical way, such as in numerical order (based on the channel position and the channel call sign of the video transmission system). With the use of a client terminal 100, the user has the ability to provide feedback to the client terminal to cause the client terminal to perform various actions in the presentation of the program guide 106. For example, the program guide 106 can be manually scrolled (vertically and horizontally) via user input Furthermore, the viewer has the ability to alter the time period or slot for which the listings are being presented and also has the ability to alter the listing format such that the listings can be sorted by channel, subject, actor, and many other variables. Also, a video picture 111 can also be shown in conjunction with the program guide 106. It should be appreciated that program guides are known in the art and embodiments of the invention can be utilized with a variety of different program guides.

The video programs can be transmitted from the video distribution system 102 to the client terminal 100 across link 105 in a digital format (e.g. Moving Pictures Experts Group (MPEG)-2 format, Advanced Television System Committee (ATSC) format, Digital Video Broadcast (DVB) format, Open Cable Standards, etc.) or analog format (e.g. National Television Standard Committee (NTSC), Phase Alternation Line (PAL), etc.) across the link 105 to the client terminal 100. The video programs typically include audio and video (A/V) information (e.g. a movie, television program, etc.) but can also include other types of information such as data. For example, the data of a digitally broadcasted video program may include graphics, video, web pages, multimedia, text, and other types of data in a variety of differing data formats (e.g. Internet Protocol (IP), Advanced Television Enhancement Forum (ATVEF) content, Open Cable Standards, etc.). In the digital environment, a digital channel (e.g. HBO) can include a tier of channels (e.g. HBO-1, HBO-2, HBO-3). Moreover, in the digital environment, the channels shown in the program guide 106 can also be computer network channels (e.g. Internet channels) that upon user selection connect the client terminal to a computer network (e.g. the Internet) and to the selected computer network channel. In this embodiment, the client terminal 100 having the appropriate hardware (network interface cards, internal/external modems, etc.) can be connected to a computer network (e.g. the Internet) with a standard telephone modem (using the plain old telephone system (POTS)), a Digital Subscriber Line (DSL) modem (using a Digital Subscriber Line), a cable modem (using a cable network), etc.

It should be appreciated that the program guide 106 can display a wide variety of types of selectable channels that offer a variety of different programming and services (e.g. video programming channels, premium channels, basic channels, expanded basic channels, music channels, computer network channels, Internet channels, Internet access channels, other channels having various services, etc.) that are aggregated from a plurality of different sources (e.g. cable providers, satellite providers, terrestrial broadcast providers, multiple-service operators (MSOs), computer network service providers, Internet Service Providers (ISPs), etc.) such that a user can select a channel from any one of these type of providers (assuming they have they the requisite access rights). This also allows for partnering among these various providers, as well as, increased customer satisfaction and lower customer churn (or attrition).

The link 105 can be broadly defined as a communication network formed by one or more transport mediums. The link 105 can include a variety of communication networks such as cable networks, terrestrial broadcast networks, satellite networks, computer networks (e.g. the Internet, wide area networks (WANs), local area networks (LANs), wireless networks, etc.), or generally any sort of public or private communications network, and combinations thereof.

Examples of a transport medium include, but are not restricted to electrical wire, optical fiber, cable, or wireless channels using terrestrial, satellite, radio frequency, or any other wireless signaling methodology. In one embodiment, the client terminal 100 is coupled to the video distribution system 102 by a link that provides a persistent connection (e.g. a cable link).

The client terminal 100 of FIG. 1 preferably includes a video distribution system interface 110, a user interface 112, a preference engine 113, a display interface 118, a local memory 120, and a terminal controller 115. The video distribution system interface 110 receives the program guide information, the program rating data 101, and the video programs from the video distribution system 102 and transmits them to the terminal controller 115 for processing. The user interface 112 is used to receive user input 114 and transmits the user input to the terminal controller 115 for processing. As will be discussed in more detail later, user input 114 is utilized for the selection of a rating source from the list of rating sources 148. The user input 114 can also cause the client terminal 100 to perform other functionality associated with client terminals (e.g. changing channels, digitally recording video programs, etc.).

The user input 114 can be from a remote control (e.g. infrared or optical), keyboard, touch screen, voice activation, mouse, telephone, cellular telephone, computer (personal, laptop, network, etc.) that is locally or remotely connected to the client terminal 100, a personal digital assistant (PDA) that is locally or remotely connected to the client terminal 100, or basically any sort of input device that is locally or remotely connected to the client terminal 100 to transmit the selections of the user to the client terminal 100. The user interface 112 may include appropriate hardware and associated software to receive the transmission of user input 114 from a local or remote user input device. For example, the user interface 112 may include: infrared (I/R) receivers, optical receivers, appropriate Input/Output (I/O) cards, network interface cards, internal/external modems (standard telephone modem, Digital Subscriber Line (DSL) modem, cable modem, etc.), plain old telephone system (POTS) receivers, cellular telephone receivers, wireless receivers, etc.; such that the client terminal 100 can be connected locally to a user input device, or, remotely to a user input device through a computer network (e.g. the Internet), the POTS, a cellular network, or a wireless network, etc. It should be appreciated by those skilled in the art that any sort of user input device through any type of connection and network can be used to transmit the selections of the user to the client terminal 100 and the above examples are only illustrative. Thus, the client terminal 100 is capable of being locally or remotely accessed to cause the client terminal 100 to perform functionality associated with client terminals such as scheduling video programs to be digitally recorded at a certain time, etc., as well as aspects of the present invention for ranking program listings based upon a selected rating source.

In some embodiments, the client terminal 100 includes a preference engine 113 coupled to the terminal controller 115. The preference engine 113 is configured to track user selection of video program content (i.e. the channels selected and the types of content on the channels selected) and to create a user profile representing the user's viewing preferences. For instance, the viewing preferences, and thus the display of channels, may be categorized based on broadcast content and the associated programming attributes associated with the program or series, such as the genre, e.g. sports, action, comedy, drama, entertainment, news, and movies, as well as, associated attributes assigned by the program guide. Additional attributes include titles of programs, actors (principal and secondary), directors, writers, etc. Moreover, the viewing preferences and the display of channels may be based on additional sources for viewing preferences such as preferred TV channels including one or more non-subscribed channels, one or more pay-per-view channels, one or more video-on-demand channels, or a combination thereof. In addition, the viewing preferences may include other categories such as advertising, infomercials, catalogs, Internet content, which is accessible, for example, via a modem.

More particularly, in one embodiment, the preference engine 113 is a software module that learns a user's viewing preferences by monitoring the user's viewing patterns or by specific explicit direction of the user. The preference engine 113 uses the viewing patterns of the user to create a user profile 163 that may be stored in local memory 120. It is contemplated that the preference engine 113 may create user profiles for more than one user and store the multiple user profiles $163_1$-$163_n$ in local memory 120. Thus, the user-specific user profile 163 represents the contents and channels the user prefers and on which day and at what time of day the user watches a specific content. Additionally, the preference 113 may create an aggregated user profile 164 (e.g. for a family) based upon a plurality of user profiles (e.g. for each individual family member) $163_1$-$163_n$, each user profile being based upon each user's viewing patterns. The client terminal 100 may continually update each individual user profile $163_1$-$163_n$ depending upon each user's actual viewing preferences and based upon other events, for example, depending on whether or not it is the season for a certain sports event. The preference engine 113, therefore, enables the client terminal 100 to have a "learning" capability for adjusting to each user's viewing preferences.

As will be discussed, the preference engine creates individual user profiles $163_1$-$163_n$ and aggregated user profiles 164, which can be selected as rating sources for ranking program listings 107 in the program guide 106. Moreover, as will be discussed, the preference engine 113 can be used to create critic profiles and virtual critic profiles that are selectable as rating sources for ranking program listings 107 in the program guide 106.

The display interface preferably 118 displays the program guide 106 including the program listing 107, as well as, the list of rating sources 148. Also, the display interface 118 displays video programs transmitted from the video distribution system 102 on the display device 104. The program guide 106 is suitably generated by the terminal controller 115 based upon the program guide information received from the video distribution system 102 and is then displayed via the display interface 118 on the display device 104. Alternatively, the video distribution system 102 can generate the program guide 106 and transmit the program guide 106 to the client terminal 100 such that the program guide is then displayed via the display interface 118 on the display device 104. In one embodiment the terminal controller 115 responsive to the ranking program 116 ranks the program listings 107 based upon a user selected rating source selected from the list of rating sources 148 and the ranked program listings are displayed via the display interface 118 on the display device 104. In another embodiment, as will be discussed, the video distribution system 102 can perform the ranking of program listings 107 based upon a user selected rating source from the list of rating sources 148 and transmits the program guide 106 with the ranked program listings 107 to the client terminal for display via the display interface 118 on the display device 104.

The local memory 120 is coupled to the terminal controller 115. In one embodiment, the local memory 120 is used to preferably store a ranking program 116, the user profiles $163_1$-$163_n$, and the aggregated user profile 164. Alternatively, the ranking program 116, the user profiles $163_1$-$163_n$, and the aggregated user profile 164 can be located or co-located at the video distribution system 102. Also, the local memory 120 can be used to store the program guide information, the program guide, the current list of rating sources, video programs, and other types of information. In one embodiment, the local memory 120 includes a rotating storage disk (e.g. magnetic, optical, etc.). Alternatively, the local memory 120 can include any type of semiconductor memory.

The terminal controller 115 is responsive to the ranking program 116 to perform many of the functions of the client terminal 100, as will be discussed. As should be appreciated by those skilled in the art, the terminal controller 115 preferably includes a suitable processor and associated memory. Furthermore, the terminal controller 115 may include encoding and decoding functionality (hardware and/or software) to encode analog signals (e.g. NTSC signals) into digital signals (e.g. MPEG-2) and to decode digital signals (e.g. MPEG-2) into analog signals (e.g. NTSC signals). This allows digital signals to be decoded for display on an analog display device and allows analog signals to be encoded into digital signals for recording in local memory along with other functionality associated with client terminals/set-top boxes. Moreover, it should be appreciated that client terminals with recording capabilites and other types of set-top boxes are well known in the art.

In one embodiment, the ranking program 116 is suitably implemented by the terminal controller 115 of the client terminal 100 as one or more instructions or code segments. The instructions/code segments when read and executed by the terminal controller 115 cause the terminal controller 115 to perform the operations necessary to implement the various functions according to embodiments of the invention. Generally, the instructions/code segments are tangibly embodied in and/or readable from a machine-readable medium, device, or carrier, such as memory, data storage devices, and/or a remote device contained within or coupled to the client terminal 100. The instructions/code segments may be loaded from memory (e.g. local memory 120), data storage devices, and/or remote devices into the terminal controller 115 for use during operations.

A user, via user input 114, can select a rating source from a list of rating sources 148 displayed on the display device 104. The terminal controller 115 responsive to the user input 114 and the ranking program 116 selects the desired rating source from the list of rating sources 148. The terminal controller 115 responsive to the ranking program 116 ranks the program listings 107 based upon program rating data associated with the selected rating source and displays the ranked program listings 107 in the program guide 106 on the display device 104. The program rating data is typically data that includes a rating for each of a plurality of programs (e.g. television programs, movies, data channels, Internet channels, etc.). A variety of rating schemes can be used. For example, numerical rating schemes can be used, e.g., a numerical rating between 1-10, 1-100, 4 stars, 5 stars, binary-1 "approved" (e.g. thumbs up), binary-0 "disapproved" (e.g. thumbs down), etc. In one embodiment, this program rating data 101 can be associated with a content rating source 103 located at a video distribution system 102. However, in some embodiments, the program rating data is generated at the client terminal 100 for ranking program listings 107, as will be discussed.

The terminal controller 115 responsive to the ranking program 116 ranks the program listings 107 by comparing the program rating data associated with the selected rating source to the currently available program listings 107 of the program guide 106 and then orders the program listings 107 based upon the rating of each program. Thus, program listings 107 can be displayed in a program guide 106 that are ranked and ordered based upon a selected rating source from a list of rating sources 148. For example, the program listings may be ordered with the highest or lowest rated program listings at the top or bottom of the ordered program guide 106, respectively.

As shown in the exemplary program guide 106, the following channels are shown: channel 52-HBO, channel 50-VH1, channel 4-NBC, channel 7-ABC, channel 53-SHO, etc. The corresponding titles of the video programs and the times are also shown. It should be appreciated that any type of program guide format can be utilized with embodiments of the invention. In this example, the channels are ranked based upon a user selecting a rating source from the list of rating sources 148. For example, a selected rating source can be a critic rating source such as movie critics (e.g. Ebert and Roeper, Leonard Maltin (Entertainment Tonight), Gene Shallit (NBC's Today Show), etc.), a printed/electronic publication (e.g. TV GUIDE), a service provider review (e.g. Cable and Satellite Network reviews of programs), Newspaper reviews, etc. Therefore, if a user selects a rating source (e.g. a critic rating source such as TV GUIDE) that includes associated program rating data that rates the following programs very highly (and in the following order): The Soprano's (e.g. rating 10), The History of Rock 'n' Roll (e.g. rating 9.5), The West Wing (e.g. rating 9.3), Who Wants to be a Millionaire (e.g. rating 9.0), and American Beauty (e.g. rating 8.5); and these programs are currently being shown, these program listings 107 will be ranked and shown in this ranked order in the program guide 106.

It should be appreciated, in a digital environment, other digital channels could be shown such as HBO-2, HBO-3, SHO-2, SHO-3, etc. Additionally, the channels shown can also be computer network channels (e.g. Internet channels) that may be rated by a rating source. For example, TV GUIDE may rate Martha Stewart's programs very highly, and a program listing 107 may be shown for one of Martha Stewart's television programs, and a program listing 107 may be shown for a web-site associated with Martha Stewart.

Figure 2:
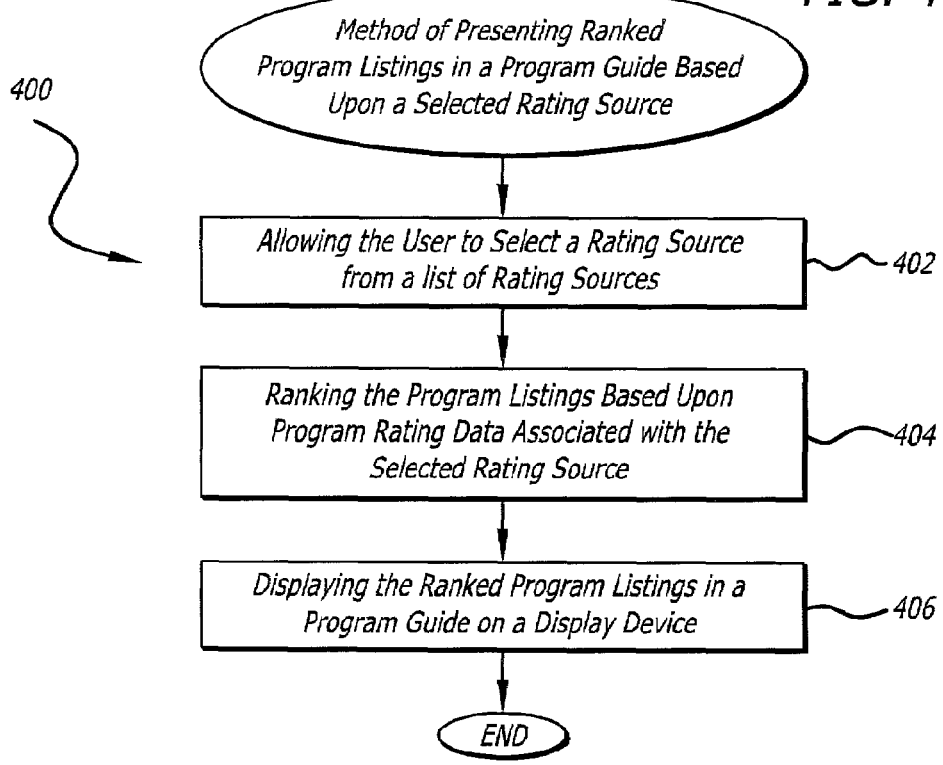
FIG. 2 shows an example of a list of rating sources according to one embodiment of the present invention.

Embodiments of the present invention can be used with a wide variety of different rating sources. FIG. 2 shows an example of a list of rating sources 148 according to one embodiment of the present invention. As shown in FIG. 2, the list of rating sources 148 includes a number of different rating sources that are selectable by the user. For example, the list of rating sources 148 can include a plurality of critic rating sources 1-N $160_{1-N}$, an aggregated subscriber rating source 162, a user profile rating source 163, an aggregated user profile rating source 164, and critic profile rating sources 1-N $166_{1-N}$. It should be appreciated that a variety of other rating sources can also be utilized and offered for selection.

As previously discussed, a selectable rating source can be a critic rating source $160_{1-N}$ such as movie critics (e.g. Ebert and Roeper, Leonard Maltin (Entertainment Tonight), Gene Shallit (NBC's Today Show), etc.), a printed/electronic publication (e.g. TV GUIDE), a service provider review (e.g. Cable and Satellite Network reviews of programs), Newspaper reviews, etc. If the rating source selected from the list of rating sources 148 is a critic rating source 160$_{1-N}$ that includes program rating data associated with a critic, the program listings 107 are ranked by the selected critic rating source and displayed in the program guide 106, as previously described. Particularly, the terminal controller 115 responsive to the ranking program 116 ranks the program listings 107 by comparing the program rating data associated with the selected critic rating source 160$_{1-N}$ to the currently available program listings 107 of the program guide 106 to order the program listings 107 based upon the rating of each program. The program listings 107 can then be displayed in the program guide 106 in ranked order.

The critic rating source 160$_{1-N}$ is typically stored at the video distribution system 102 as one of the rating sources 103. In this embodiment, with brief reference also to FIG. 3, the critic rating source 160$_{1-N}$ is stored within memory 153 of the video distribution system 102 as part of the stored rating sources 103 and the program rating data 101 associated with the critic rating source 160$_{1-N}$ is transmitted via link 105 to the client terminal 100 for use by the terminal controller 115 in ranking and displaying the program listings.

Thus, as an example, with reference to FIG. 1, if a user selects a critic rating source 160$_{1-N}$ (e.g. TV GUIDE) that includes associated program rating data 101 that rates the following programs very highly (and in the following order): The Soprano's (e.g. rating 10), The History of Rock 'n' Roll (rating 9.5), The West Wing (rating 9.3), Who Wants to be a Millionaire (rating 9.0), and American Beauty (rating 8.5); and these programs are currently being shown, these program listings 107 will be ranked and shown in this ranked order in the program guide 106.

Another type of selectable critic rating source 160$_{1-N}$ is a virtual critic rating source that includes program rating data associated with a plurality of critics (e.g. critic rating sources). The virtual critic rating source combines the program rating data associated with a variety of different critic sources to create a virtual or combined critic. For example, the program rating data associated with the variety of different critic sources to create the virtual or combined critic, could be combined by averaging. In one embodiment, the user can pick the critics they want to combine together to form their virtual critic. Alternatively, a plurality of virtual critics can be presented for selection by the user. It should be appreciated that a wide variety of virtual critics can be created. For example, a combination of two or more of the following critic rating sources could be used: movie critics (e.g. Ebert and Roeper, Leonard Maltin (Entertainment Tonight), Gene Shallit (NBC's Today Show), etc.), a printed/electronic publication (e.g. TV GUIDE), a service provider review (e.g. Cable and Satellite Network reviews of programs), Newspaper reviews, etc. If the rating source selected from the list of rating sources 148 is a virtual critic rating source 160$_{1-N}$ that includes program rating data associated with a plurality of critics, the program listings 107 are ranked by the selected virtual critic rating source and displayed in the program guide 106, as previously described. Particularly, the terminal controller 115 responsive to the ranking program 116 ranks the program listings 107 by comparing the program rating data associated with the selected virtual critic rating source 160$_{1-N}$ to the currently available program listings 107 of the program guide 106 to order the program listings 107 based upon the rating of each program. The program listings 107 can then be displayed in the program guide 106 in ranked order.

The virtual critic rating source 160$_{1-N}$ is typically stored at the video distribution system 102 as one of the rating sources 103. In this embodiment, with brief reference also to FIG. 3, the virtual critic rating source 160$_{1-N}$ is stored within memory 153 of the video distribution system 102 as part of the stored rating sources 103 and the program rating data 101 associated with the virtual critic rating source 160$_{1-N}$ is transmitted via link 105 to the client terminal 100 for use by the terminal controller 115 in ranking and displaying the program listings.

Thus, as an example, with reference to FIG. 1, if a user selects a virtual critic rating source 160$_{1-N}$ (e.g. a combination of Ebert and Roeper and TV GUIDE) that includes associated program rating data 101 that rates the following programs very highly (and in the following order): The Soprano's (e.g. rating 10), The History of Rock 'n' Roll (rating 9.5), The West Wing (rating 9.3), Who Wants to be a Millionaire (rating 9.0), and American Beauty (rating 8.5); and these programs are currently being shown, these program listings 107 will be ranked and shown in this ranked order in the program guide 106.

Another selectable rating source from the list of rating sources 148 is the aggregated subscriber rating source 162. If the rating source selected is the aggregated subscriber rating source 162, which includes program rating data based upon the aggregated usage characteristics of other subscribers to the video distribution system 102, the program listings 107 are ranked by the selected aggregated subscriber rating source and displayed in the program guide 106. Particularly, the terminal controller 115 responsive to the ranking program 116 ranks the program listings 107 by comparing the program rating data associated with the selected aggregated subscriber rating source 162 to the currently available program listings 107 of the program guide 106 to order the program listings 107 based upon the rating of each program. The program listings 107 can then be displayed in the program guide 106 in ranked order.

The aggregated subscriber rating source 162 is typically stored at the video distribution system 102 as one of the rating sources 103. In this embodiment, with brief reference also to FIG. 3, the aggregated subscriber rating source 162 is stored within memory 153 of the video distribution system 102 as part of the stored rating sources 103 and the program rating data 101 associated with the aggregated subscriber rating source 162 is transmitted via link 105 to the client terminal 100 for use by the terminal controller 115 in ranking and displaying the program listings.

Thus, as an example, with reference to FIG. 1, if a user selects the aggregated subscriber rating source 162 that includes associated program rating data 101 aggregated from a set of subscribers to the video distribution system 102 and they rate the following programs very highly (and in the following order): The Soprano's (e.g. rating 10), The History of Rock 'n' Roll (e.g. rating 9.5), The West Wing (e.g. rating 9.3), Who Wants to be a Millionaire (e.g. rating 9.0), and American Beauty (e.g. rating 8.5); and these programs are currently being shown, these program listings 107 will be ranked and shown in this ranked order in the program guide 106.

Another selectable rating source from the list of rating sources 148 is a user profile rating source 163. Multiple user profile rating sources 163$_{1-N}$ may be shown in the list of rating sources 148. As previously discussed, local memory 120 of the client terminal can store multiple user profiles 163$_{1-N}$, thus a user (e.g. a member of family) can select a user profile 163 for himself or herself, or another user profile 163 (e.g. another member of the family). As previously described, the user profile 163 includes the preferences of the user. Unlike a selectable critic rating source 160, which includes specific program rating data for specific programs, the user profile 163 is an actual profile, that is generated by the preference engine 113 based upon the user's past viewing history, as previously discussed. Thus, the user profile 163 rank programs, based on the preferences of the user, without necessarily having actual specific program rating data for the particular programs. If the rating source selected is a user profile 163, the terminal controller 115 responsive to the ranking program 116 applies the selected user profile to the program guide information to create program rating data associated with the user profile. Next, the terminal controller 115 responsive to the ranking program 116 ranks the program listings 107 by comparing the program rating data associated with the selected user profile 163 to the currently available program listings 107 to order the program listings 107 based upon the rating of each program and displays the program listings 107 in ranked order in the program guide 106.

The user profiles $163_{1-N}$ can also be located or co-located at the video distribution system 102 as one of the rating sources 103. In this embodiment, with brief reference also to FIG. 3, the user profiles $163_{1-N}$ are stored within memory 153 of the video distribution system 102 as part of the stored rating sources 103 and the program rating data 101 associated with the selected user profile $163_{1-N}$ is transmitted via link 105 to the client terminal 100 for use by the terminal controller 115 in ranking and displaying the program listings. In this embodiment, the video distribution system 102 applies the selected user profile to the program guide information to create program rating data associated with the user profile. Alternatively, just the selected user profile 163 is transmitted via link 105 to the client terminal 100 and the client terminal does the subsequent processing, as previously discussed.

Thus, as an example, with reference to FIG. 1, if a user selects a user profile 163, the terminal controller 115 responsive to the ranking program applies the selected user profile 163 to the program guide information to create program rating data that rates the following programs very highly (and in the following order): The Soprano's (e.g. rating 10), The History of Rock 'n' Roll (e.g. rating 9.5), The West Wing (e.g. rating 9.3), Who Wants to be a Millionaire (e.g. rating 9.0), and American Beauty (e.g. rating 8.5); and these programs are currently being shown, these program listings 107 will be ranked and shown in this ranked order in the program guide 106.

An additional selectable rating source from the list of rating sources 148 is an aggregated user profile rating source 164. As previously discussed, local memory 120 of the client terminal can store multiple user profiles $163_{1-N}$, thus a user (e.g. a member of family) can select an aggregated user profile that is a combination of all the user profiles $163_{1-N}$ (e.g. all the members of the family). As previously described, the aggregated user profile 164 includes the aggregated preferences of multiple users. Unlike a selectable critic rating source 160, which includes specific program rating data for specific programs, the aggregated user profile 164 is an actual profile, that is generated by the preference engine 113 based upon the past viewing history of the aggregated users, as previously discussed. Thus, the aggregated user profile 164 ranks programs, based on the preferences of the aggregated users, without necessarily having actual specific program rating data for the particular programs. If the rating source selected is the aggregated user profile 164, the terminal controller 115 responsive to the ranking program 116 applies the selected aggregated user profile 164 to the program guide information to create program rating data associated with the aggregated user profile 164. Next, the terminal controller 115 responsive to the ranking program 116 ranks the program listings 107 by comparing the program rating data associated with the selected aggregated user profile 164 to the currently available program listings 107 to order the program listings 107 based upon the rating of each program and displays the program listings in ranked order in the program guide 106.

The aggregated user profile 164 can also be located or co-located at the video distribution system 102 as one of the rating sources 103. In this embodiment, with brief reference also to FIG. 3, the aggregated user profile 164 (which is one of a plurality of aggregated user profiles $164_{1-N}$) is stored within memory 153 of the video distribution system 102 as part of the stored rating sources 103 and the program rating data 101 associated with the selected aggregated user profile 164 is transmitted via link 105 to the client terminal 100 for use by the terminal controller 115 in ranking and displaying the program listings. In this embodiment, the video distribution system 102 applies the selected aggregated user profile 164 to the program guide information to create program rating data associated with the aggregated user profile 164. Alternatively, just the aggregated user profile 164 is transmitted via link 105 to the client terminal 100 and the client terminal does the subsequent processing, as previously discussed.

Thus, as an example, with reference to FIG. 1, if a user selects an aggregated user profile 164, the terminal controller 115 responsive to the ranking program applies the selected aggregated user profile 164 to the program guide information to create program rating data that rates the following programs very highly (and in the following order): The Soprano's (e.g. rating 10), The History of Rock 'n' Roll (e.g. rating 9.5), The West Wing (e.g. rating 9.3), Who Wants to be a Millionaire (e.g. rating 9.0), and American Beauty (e.g. rating 8.5); and these programs are currently being shown, these program listings 107 will be ranked and shown in this ranked order in the program guide 106.

Yet another selectable rating source from the list of program rating sources 148 is a critic profile 166. For example, the list of rating sources 148 can include a plurality of critic profile rating sources 1-N $166_{1-N}$. Unlike a selectable critic rating source 160, which includes specific program rating data for specific programs, the critic profile rating sources are actual profiles (similar to the user profile 163), that are generated by a preference engine based upon a past history of ratings by the critic rating source, such as past program rating data associated with the critic. Thus, the critic profile 166 ranks programs, based on the preferences of the critic rating source, without necessarily having actual specific program rating data for the particular programs. Examples of critic profiles $166_{1-N}$ can be the same as the critic rating sources $160_{1-N}$, but can also include other critic profiles. Accordingly, similar to the critic rating source, critic profiles can include such content review sources such as movie critics (e.g. Ebert and Roeper, Leonard Maltin (Entertainment Tonight), Gene Shallit (NBC's Today Show), etc.), a printed/electronic publication (e.g. TV GUIDE), a service provider review (e.g. Cable and Satellite Network reviews of programs), Newspaper reviews, etc.

Moreover, the list of rating sources 148 can include a plurality of virtual critic profile rating sources 1-N $166_{1-N}$. Unlike a selectable critic rating source 160, which includes specific program rating data for specific programs, the virtual critic profile rating sources are actual profiles (similar to the user profile 163), that are generated by the preference engine based upon a past history of ratings by a plurality of critic rating sources, such as past program rating data associated with the plurality of critics. Particularly, the preference engine creates a virtual critic profile based upon program rating data associated with a plurality of critic rating sources (e.g. critics associated with critic rating sources). Thus, the virtual critic profile 166 ranks programs, based on the preferences of the plurality of critic rating sources, without necessarily having actual specific program rating data for the particular programs. In one embodiment, the user can pick the critics they want to combine together to form their own virtual critic profile. Alternatively, a plurality of virtual critic profiles can be presented for selection by the user. Examples of virtual critic profiles $166_{1-N}$ can be combinations of two or more of the critic rating sources $160_{1-N}$, but can also include other critic profiles. It should be appreciated that a wide variety of virtual critic profiles can be created. For example, a combination of two or more of the following critic rating sources could be used to create a virtual critic profile: movie critics (e.g. Ebert and Roeper, Leonard Maltin (Entertainment Tonight), Gene Shallit (NBC's Today Show), etc.), a printed/electronic publication (e.g. TV GUIDE), a service provider review (e.g. Cable and Satellite Network reviews of programs), Newspaper reviews, etc.

Accordingly, similar to the critic rating source, critic profiles and virtual critic profiles can include such content review sources such as: movie critics (e.g. Ebert and Roeper, Leonard Maltin (Entertainment Tonight), Gene Shallit (NBC's Today Show), etc.), a printed/electronic publication (e.g. TV GUIDE), a service provider review (e.g. Cable and Satellite Network reviews of programs), Newspaper reviews, etc.

The critic rating profiles and virtual critic rating profiles $166_{1-N}$ can be generated locally at the client terminal 100 by the preference engine 113 based on critic rating source data received from the video distribution system 102 and stored in local memory 120. Alternatively, with brief reference to FIG. 3, critic rating profiles and virtual critic rating profiles $166_{1-N}$ can be generated remotely at the video distribution system 102 by the preference engine 158 based on critic rating source data stored at the video distribution system 102. Further, the critic rating profiles and virtual critic rating profiles $166_{1-N}$ can be stored in memory 153 at the video distribution system 102. The use of preference engines to create profiles has been previously discussed.

In one embodiment, where the client terminal 100 generates the critic profile or virtual critic profile $166_{1-N}$ using the preference engine 113, if the rating source selected is a critic profile or virtual critic profile $166_{1-N}$, the terminal controller 115 responsive to the ranking program 116 applies the selected critic profile or virtual critic profile 166 to the program guide information to create program rating data associated with the selected critic or virtual critic profile 166. Next, the terminal controller 115 responsive to the ranking program 116 ranks the program listings 107 by comparing the program rating data associated with the selected critic or virtual critic profile 166 to the currently available program listings 107 to order the program listings 107 based upon the rating of each program and displays the program listings in ranked order in the program guide 106.

In the embodiment where the selected critic or virtual critic profile 166 is located at the video distribution system 102, the program rating data 101 associated with the selected critic or virtual critic profile 166 is transmitted via link 105 to the client terminal 100 for use by the terminal controller 115 in ranking and displaying the program listings. In this embodiment, the video distribution system 102 applies the selected critic or virtual critic profile 166 to the program guide information to create the program rating data associated with the selected critic or virtual critic profile 166. Alternatively, just the selected critic or virtual critic profile 166 is transmitted via link 105 to the client terminal 100 and the client terminal does the subsequent processing, as previously discussed.

Thus, as an example, with reference to FIG. 1, if a user selects a critic or virtual critic profile 166, the terminal controller 115 responsive to the ranking program applies the selected critic or virtual critic profile to the program guide information to create program rating data that rates the following programs very highly (and in the following order): The Soprano's (e.g. rating 10), The History of Rock 'n' Roll (e.g. rating 9.5), The West Wing (e.g. rating 9.3), Who Wants to be a Millionaire (e.g. rating 9.0), and American Beauty (e.g. rating 8.5); and these programs are currently being shown, these program listings 107 will be ranked and shown in this ranked order in the program guide 106.

Thus, embodiments of the invention, allow for program listings to be automatically ranked and ordered in a program guide based upon a user selecting a rating source from a list of rating sources displayed on their display device.

As discussed previously, the video distribution system 102 performs some functions in conjunction with the client terminal 100. Moreover, in some embodiments of the invention, the video distribution system 102 can perform many functions in place of the client terminal 100.

Figure 3:
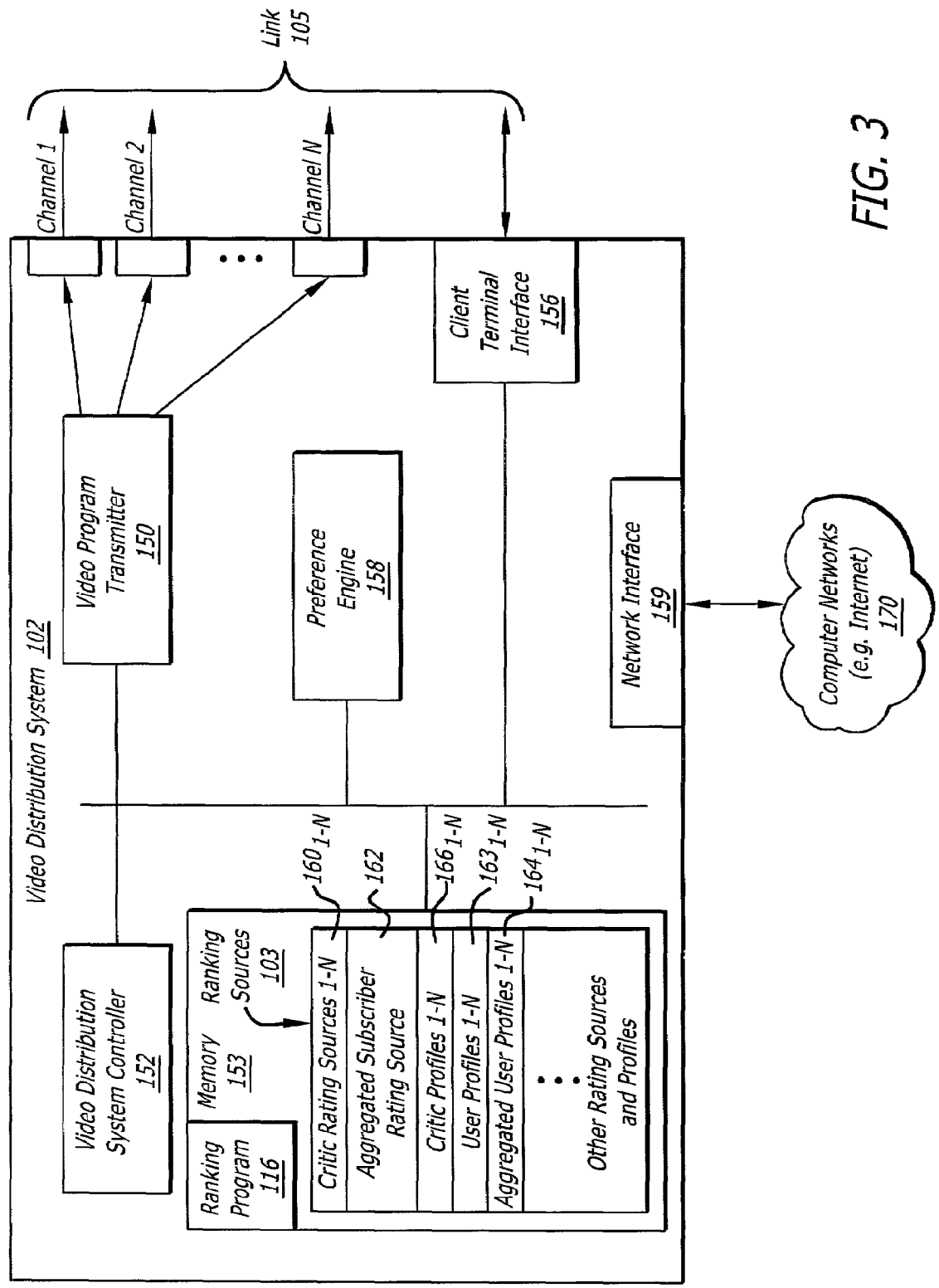
FIG. 3 shows a more specific embodiment of the video distribution system of FIG. 1 according to one embodiment of the present invention.

Referring also to FIG. 3, FIG. 3 shows a more specific embodiment of the video distribution system 102 of FIG. 1. The video distribution system 102 includes a video program transmitter 150, a video distribution system controller 152, a memory 153, a client terminal interface 156, a preference engine 158, and a network interface 159. Under the control of the video distribution system controller 152, the video program transmitter 150 transmits video programs, program guide information, and program rating data 110 on channels $_{1-N}$ via link 105 to client terminals.

The memory 153 stores a ranking program 116. The ranking program 116 can be another instance of the ranking program 116, as previously discussed with reference to the client terminal 100. The memory 153 also stores the rating sources 103 which include a plurality of critic rating sources 1-N $160_{1-N}$ (including virtual critic rating sources), aggregated subscriber rating source 162, a plurality of user profile rating sources 1-N $163_{1-N}$, a plurality of aggregate user profile rating source 1-N $164_{1-N}$, and a plurality of critic profile rating sources 1-N $166_{1-N}$ (including virtual critic profile rating sources). It should be appreciated that a variety of other rating sources can also be stored at the video distribution system 102. The memory 153 can include rotating storage disk type memory (e.g. magnetic, optical, etc.), data storage devices, any type of semiconductor memory (RAM, ROM, etc), or any type of suitable memory for storing this type of data.

The client terminal interface 156 is a suitable interface for communication with client terminals via link 105. The preference engine 158 can be a preference engine similar to the preference engine 113, previously described. The network interface 159 couples the video distribution system 102 to other computer networks 170 (e.g. WANs, LANs, the Internet, etc.). In one particular embodiment, the video distribution system 102 can receive data for the rating sources 103 (e.g. critic rating sources 1-N $160_{1-N}$, the aggregated subscriber rating source 162, user profile rating sources 1-N $163_{1-N}$, aggregated user profile rating source 1-N $164_{1-N}$, and critic profile rating sources 1-N $166_{1-N}$) from other computer networks 170 via the network interface 170. For example, the video distribution system 102 could receive data for the critic rating source 160, e.g. TV GUIDE, from a web-site for TV GUIDE over the Internet.

Using embodiments of the invention related to the video distribution system 102, a user, via user input 114, can select a rating source from the list of rating sources 148 displayed on the display device 104. The video distribution system controller 152 responsive to the user input 114 received over link 105 from the client terminal 100 and the ranking program 116, selects the desired rating source from the rating sources 103 stored in memory 153 to correspond with the rating source selected from the list of rating sources 148 by the user. The video distribution system controller 152 responsive to the ranking program 116 ranks the program listings 107 based upon program rating data associated with the selected rating source. The video distribution system controller 152 then commands the client terminal 100 to display the ranked program listings 107 in the program guide 106 on the display device 104. The program rating data is typically data that includes a rating for each of a plurality of programs (e.g. television programs, movies, data channels, Internet channels, etc.). A variety of rating schemes can be used. For example, numerical rating schemes can be used, e.g., a numerical rating between 1-10, 1-100, 4 stars, 5 stars, binary-1 "approved" (e.g. thumbs up), binary-0 "disapproved" (e.g. thumbs down), etc.

The video distribution system controller 152 responsive to the ranking program 116 ranks the program listings 107 by comparing the program rating data associated with the selected rating source to the currently available program listings 107 of the program guide 106 and then orders the program listings 107 based upon the rating of each program for display. Thus, program listings 107 can be displayed in a program guide 106 that are ranked and ordered based upon a selected rating source from a list of rating sources 148. For example, the program listings may be ordered with the highest or lowest rated program listings at the top or bottom of the ordered program guide 106, respectively. Thus, in this embodiment, the video distribution system 102 performs many of the functions previously described as being performed by the client terminal 100.

For example, if a critic rating source or a virtual critic rating source $160_{1-N}$, such as movie critics (e.g. Ebert and Roeper, Leonard Maltin (Entertainment Tonight), Gene Shallit (NBC's Today Show), etc.), a printed/electronic publication (e.g. TV GUIDE), a service provider review (e.g. Cable and Satellite Network reviews of programs), Newspaper reviews, (or a combination thereof in case of the virtual critic rating source), etc., is selected from the list of rating sources 148, the program rating data associated with selected critic or virtual critic rating source is used to rank the program listings 107, as previously described. Particularly, the video distribution system controller 152 responsive to the ranking program 116 ranks the program listings 107 by comparing the program rating data associated with the selected critic or virtual critic rating source $160_{1-N}$ to the currently available program listings 107 of the program guide 106 to order the program listings 107 based upon the rating of each program. The video distribution system controller 152 then commands the client terminal 100 to display the ranked program listings 107 in the program guide 106 on the display device 104. Alternatively, the video distribution system controller 152 can send a program guide 106 that is ranked to the client terminal 100.

As another example, if the aggregated subscriber rating source 162 is selected from the list of rating sources 148 the program rating data associated with selected critic rating source is used to rank the program listings 107, as previously described. The aggregated subscriber rating source 162 includes program rating data based upon the aggregated usage characteristics of other subscribers to the video distribution system 102. Particularly, the video distribution system controller 152 responsive to the ranking program 116 ranks the program listings 107 by comparing the program rating data associated with the selected the aggregated subscriber rating source 162 to the currently available program listings 107 of the program guide 106 to order the program listings 107 based upon the rating of each program. The video distribution system controller 152 then commands the client terminal 100 to display the ranked program listings 107 in the program guide 106 on the display device 104. Alternatively, the video distribution system controller 152 can send a program guide 106 that is ranked to the client terminal 100.

In some embodiments, the video distribution system 102 stores user profiles $163_{1-N}$ for the users of the client terminals. The user profiles $163_{1-N}$ can be generated by the preference engine 113 of the client terminal 100 and uploaded to the video distribution system 102 or the user profiles can be generated at the video distribution system 102 using the video distribution system's preference engine 158. Moreover, the video distribution system 102 can also store aggregated user profiles $164_{1-N}$, as previously discussed, for the users of the client terminals. User profiles, aggregated user profiles, and preference engines have been previously discussed.

A user may select a user profile rating source 163 from the list of rating sources 148. Unlike a selectable critic rating source 160, which includes specific program rating data for specific programs, the user profile 163 is an actual profile, that is generated by a preference engine based upon the user's past viewing history, as previously discussed. Thus, the user profile 163 can be used to rank programs, based on the preferences of the user, without necessarily having actual specific program rating data for the particular programs. If the rating source selected is a user profile 163, the video distribution system controller 152 responsive to the ranking program 116 applies the selected user profile to the program guide information to create program rating data associated with the user profile. Next, the video distribution system controller 152 responsive to the ranking program 116 ranks the program listings 107 by comparing the program rating data associated with the selected user profile 163 to the currently available program listings 107 to order the program listings 107 based upon the rating of each program. The video distribution system controller 152 then commands the client terminal 100 to display the ranked program listings 107 in the program guide 106 on the display device 104. Alternatively, the video distribution system controller 152 can send a program guide 106 that is ranked to the client terminal 100.

A user may select an aggregated user profile rating source 164 from the list of rating sources 148. As previously described, the aggregated user profile 164 includes the aggregated preferences of multiple users. Unlike a selectable critic rating source 160, which includes specific program rating data for specific programs, the aggregated user profile 164 is an actual profile, that is generated by a preference engine based upon an aggregation of various user's past viewing histories (e.g. an aggregated user profile can be for a family having a client terminal, each family member having an individual user profile), as previously discussed. Thus, the aggregated user profile 164 can be used to rank programs, based on the aggregated preferences of the users, without necessarily having actual specific program rating data for the particular programs. If the rating source selected is aggregated user profile 164, the video distribution system controller 152 responsive to the ranking program 116 applies the selected aggregated user profile 164 to the program guide information to create program rating data associated with the aggregated user profile 164. Next, the video distribution system controller 152 responsive to the ranking program 116 ranks the program listings 107 by comparing the program rating data associated with the selected aggregated user profile 164 to the currently available program listings 107 to order the program listings 107 based upon the rating of each program. The video distribution system controller 152 then commands the client terminal 100 to display the ranked program listings 107 in the program guide 106 on the display device 104. Alternatively, the video distribution system controller 152 can send a program guide 106 that is ranked to the client terminal 100.

A user may select a critic profile rating source 166 from the list of rating sources 148. For example, the list of rating sources 148 can include a plurality of critic profile rating sources 1-N $166_{1-N}$. Unlike a selectable critic rating source 160, which includes specific program rating data for specific programs, the critic profile rating sources $166_{1-N}$ are actual profiles (similar to the user profile 163), that are generated by the preference engine 158 based upon a past history of ratings by the critic rating source, such as past program rating data associated with the critic. Thus, the critic profile 166 ranks programs, based on the preferences of the critic rating source, without necessarily having actual specific program rating data for the particular programs. The use of preference engines to create profiles has been previously discussed. Examples of critic profiles $166_{1-N}$ can be the same as the critic rating sources $160_{1-N}$, but can also include other critic profiles. Accordingly, similar to the critic rating source, critic profiles can include such content review sources such as movie critics (e.g. Ebert and Roeper, Leonard Maltin (Entertainment Tonight), Gene Shallit (NBC's Today Show), etc.), a printed/electronic publication (e.g. TV GUIDE), a service provider review (e.g. Cable and Satellite Network reviews of programs), Newspaper reviews, etc.

Moreover, as previously discussed a user may select one of a plurality of virtual critic profile rating sources 1-N $166_{1-N}$ from the list of rating sources 148. Unlike a selectable critic rating source 160, which includes specific program rating data for specific programs, the virtual critic profile rating sources are actual profiles (similar to the user profile 163), that are generated by the preference engine 158 based upon a past history of ratings by a plurality of critic rating sources, such as past program rating data associated with the plurality of critics. Particularly, the preference engine 158 creates a virtual critic profile based upon program rating data associated with a plurality of critic rating sources (e.g. critics associated with critic rating sources). The use of preference engines to create profiles has been previously discussed. Thus, the virtual critic profile 166 ranks programs, based on the preferences of the plurality of critic rating sources, without necessarily having actual specific program rating data for the particular programs. In one embodiment, the user can pick the critics they want to combine to together to form their own virtual critic profile.

Alternatively, a plurality of virtual critic profiles can be presented for selection by the user. Examples of virtual critic profiles $166_{1-N}$ can be combinations of two or more of the critic rating sources $160_{1-N}$, but can also include other critic profiles. It should be appreciated that a wide variety of virtual critic profiles can be created. For example, a combination of two or more of the following critic rating sources could be used to create a virtual critic profile: movie critics (e.g. Ebert and Roeper, Leonard Maltin (Entertainment Tonight), Gene Shallit (NBC's Today Show), etc.), a printed/electronic publication (e.g. TV GUIDE), a service provider review (e.g. Cable and Satellite Network reviews of programs), Newspaper reviews, etc.

In one embodiment, where the video distribution system 102 generates the critic profile or the virtual critic profile using the preference engine 158, if the rating source selected is a critic profile or a virtual critic profile $166_{1-N}$, the video distribution system controller 152 responsive to the ranking program 116 applies the selected critic or virtual critic profile 166 to the program guide information to create program rating data associated with the selected critic or virtual critic profile 166. Next, the video distribution system controller 152 responsive to the ranking program 116 ranks the program listings 107 by comparing the program rating data associated with the selected critic or virtual critic profile 166 to the currently available program listings 107 to order the program listings 107 based upon the rating of each program. The video distribution system controller 152 then commands the client terminal 100 to display the ranked program listings 107 in the program guide 106 on the display device 104. Alternatively, the video distribution system controller 152 can send a program guide 106 that is ranked to the client terminal 100.

FIG. 4 is a flow diagram according to one embodiment of the present invention. The flow diagram 400 illustrates a method for presenting ranked program listings in a program guide based upon a selected rating source. At step 402, a user is allowed to select a rating source from a list of rating sources. Next, at step 404, the terminal controller 115 responsive to the ranking program 116 ranks the program listings 107 based upon program rating data associated with the selected rating source. At step 406, the terminal controller 115 responsive to the ranking program 116 causes the ranked program listings to be displayed in a program guide 106 on a display device 104.

FIG. 5 is a more detailed flow diagram according to one embodiment of the present invention. The flow diagram 500 illustrates another embodiment of a method for presenting ranked program listings in a program guide based upon a selected rating source. At step 502, a user is allowed to select a rating source from a list of rating sources.

At step 504, the terminal controller 115 responsive to the ranking program 116 determines whether the selected rating source is a critic rating source. If so, at step 506 the terminal controller 115 responsive to the ranking program 116 ranks the program listings 107 based upon the selected critic rating source. At step 508, the terminal controller 115 responsive to the ranking program 116 causes the ranked program listings to be displayed in a program guide 106 on a display device 104.

If the rating source selected is not a critic rating source, at step 510, the terminal controller 115 responsive to the ranking program 116 determines whether the selected rating source is an aggregated subscriber rating source. If so, at step 506 the terminal controller responsive to the ranking program 116 ranks the program listings 107 based upon the selected aggregated subscriber rating source. At step 508, the terminal controller 115 responsive to the ranking program 116 causes the ranked program listings to be displayed in a program guide 106 on a display device 104.

Otherwise, if the rating source selected is not an aggregated subscriber rating source, at step 512, the terminal controller 115 responsive to the ranking program 116 determines whether the selected rating source is a user profile rating source. If so, at step 506 the terminal controller 115 responsive to the ranking program 116 ranks the program listings 107 based upon the selected user profile rating source. At step 508, the terminal controller 115 responsive to the ranking program 116 causes the ranked program listings to be displayed in a program guide 106 on a display device 104.

On the other hand, if the rating source selected is not a user profile rating source, at step 514, the terminal controller 115 responsive to the ranking program 116 determines whether the selected rating source is an aggregated user profile rating source. If so, at step 506 the terminal controller 115 responsive to the ranking program 116 ranks the program listings 107 based upon the selected aggregated user profile rating source. At step 508, the terminal controller 115 responsive to the ranking program 116 causes the ranked program listings to be displayed in a program guide 106 on a display device 104.

However, if the rating source selected is not an aggregated user profile rating source, at step 516, the terminal controller 115 responsive to the ranking program 116 determines whether the selected rating source is a critic profile rating source. If so, at step 506 the terminal controller 115 responsive to the ranking program 116 ranks the program listings 107 based upon the selected critic profile rating source. At step 508, the terminal controller 115 responsive to the ranking program 116 causes the ranked program listings to be displayed in a program guide 106 on a display device 104. If not, the flow diagram returns to step 502.

The embodiments of the present invention and their various functional components can be implemented in hardware, software, firmware, middleware or a combination thereof and utilized in systems, subsystems, components, or sub-components thereof. When implemented in software, these embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a terminal controller, a processor, a computer, etc.). Examples of the machine/processor-readable medium include an electronic circuit, a semiconductor memory device, a ROM, a flash memory, an erasable programmable ROM (EPROM), a floppy diskette, CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

We claim:

1. A client terminal connectable to a video distribution system and a display device, the video distribution system provides program guide information to create a program guide that includes program listings and provides program rating data that is associated with rating sources, the client terminal comprising:
 a video distribution system interface to receive the program guide information and the program rating data;
 a display interface to display the program guide on the display device;
 a user interface to receive user input;
 a local memory to store a ranking program; and
 a terminal controller responsive to the user interface and the ranking program for:
  a. allowing the user to select a critic profile based upon a critic rating source from a list of a plurality of different critic profiles displayed on the display device via user input;
  b. generating the critic profile based upon past program rating data associated with the critic rating source by utilizing a preference engine to rate at least one program that does not have program rating data associated with the critic rating source;
  c. ranking and ordering program listings based upon the selected critic profile; and
  d. displaying the ranked and ordered program listings in the program guide on the display device.

2. The client terminal of claim 1, wherein, the preference engine further creates a user profile based upon a user's viewing patterns.

3. The client terminal of claim 2, wherein the terminal controller is further responsive to the user interface and the ranking program for allowing the user to select a user profile and applying the user profile to the program guide information of the program guide to create program rating data associated with the user profile to rank and display the program listings in the program guide.

4. The client terminal of claim 2, wherein the preference engine creates an aggregated user profile based upon a plurality of user profiles for a plurality of users, each user profile being based upon each user's viewing patterns.

5. The client terminal of claim 4, wherein the terminal controller is further responsive to the user interface and the ranking program for allowing the user to select an aggregated user profile and applying the aggregated user profile to the program guide information of the program guide to create program rating data associated with the aggregated user profile to rank and display the program listings in the program guide.

6. The client terminal of claim 1, wherein, the preference engine creates a virtual critic profile based upon program rating data associated with a plurality of critics from a plurality of different critic rating sources, respectively.

7. The client terminal of claim 6, wherein the terminal controller is further responsive to the user interface and the ranking program for allowing the user to select a virtual critic profile and applying the virtual critic profile to the program guide information of the program guide to create program rating data associated with the virtual critic profile to rank and display the program listings in the program guide.

8. The client terminal of claim 1, wherein, the client terminal is coupled to the video distribution system by a link that provides a persistent connection.

9. A computer readable storage medium encoded thereon with computer readable instructions executable by a client terminal connectable to a video distribution system and a display device, the video distribution system provides program guide information to create a program guide that includes program listings and provides program rating data that is associated with rating sources, the computer readable instructions comprising code segments for:
  a. allowing the user to select a critic profile based upon a critic rating source from a list of a plurality of different critic profiles displayed on the display device via user input;
  b. generating the critic profile based upon past program rating data associated with the critic rating source by utilizing a preference engine to rate at least one program that does not have program rating data associated with the critic rating source;
  c. ranking and ordering program listings based upon the selected critic profile; and
  d. displaying the ranked and ordered program listings in the program guide on the display device.

10. The computer readable instructions of claim 9, wherein, the preference engine creates a user profile based upon a users viewing patterns.

11. The computer readable instructions of claim 10, further comprising code segments for:
  a. allowing the user to select the user profile;
  b. applying the user profile to the program guide information of the program guide to create program rating data associated with the user profile;
  c. ranking the program listings; and
  d. displaying the program listings in the program guide.

12. The computer readable instructions of claim 9, wherein, the preference engine creates an aggregated user profile based upon a plurality of user profiles for a plurality of users, each user profile being based upon each user's viewing patterns.

13. The computer readable instructions of claim 12, further comprising code segments for:
  a. allowing the user to select the aggregated user profile;
  b. applying the aggregated user profile to the program guide information of the program guide to create program rating data associated with the aggregated user profile;
  c. ranking the program listings; and
  d. displaying the program listings in the program guide.

14. The computer readable instructions of claim 9, wherein, the preference engine creates a virtual critic profile based upon program rating data associated with a plurality of critics from a plurality of different critic rating sources, respectively.

15. The computer readable instructions of claim 14, further comprising code segments for:
  a. allowing the user to select the virtual critic profile;
  b. applying the virtual critic profile to the program guide information of the program guide to create program rating data associated with the virtual critic profile;
  c. ranking the program listings; and
  d. displaying the program listings in the program guide.

16. The computer readable instructions of claim 9, wherein, the client terminal is coupled to the video distribution system by a link that provides a persistent connection.

17. A method for presenting ranked program listings in a program guide based upon a selected rating source, the method comprising the steps of:
  a. allowing the user to select a critic profile based upon a critic rating source from a list of a plurality of different critic profiles displayed on the display device via user input;
  b. generating the critic profile based upon past program rating data associated with the critic rating source by utilizing a preference engine to rate at least one program that does not have program rating data associated with the critic rating source;
  c. ranking and ordering program listings based upon the selected critic profile; and
  d. displaying the ranked and ordered program listings in the program guide on the display device.

18. The method of claim 17, further comprising the step of creating a user profile based upon a user's viewing patterns utilizing the preference engine.

19. The method of claim 18, further comprising the steps of:
  a. allowing the user to select the user profile;
  b. applying the user profile to the program guide information of the program guide to create program rating data associated with the user profile;
  c. ranking the program listings; and
  d. displaying the program listings in the program guide.

20. The method of claim 17, further comprising the step of creating an aggregated user profile based upon a plurality of user profiles for a plurality of users, each user profile being based upon each user's viewing patterns utilizing the preference engine.

21. The method of claim 20, further comprising the steps of:
  a. allowing the user to select the aggregated user profile;
  b. applying the aggregated user profile to the program guide information of the program guide to create program rating data associated with the aggregated user profile;
  c. ranking the program listings; and
  d. displaying the program listings in the program guide.

22. The method of claim 17, further comprising the step of creating a virtual critic profile based upon a plurality critics' preferences derived from program rating data associated with a plurality of critics from a plurality of different critic rating sources, respectively, utilizing the preference engine.

23. The method of claim 22, further comprising the steps of:
  a. allowing the user to select the virtual critic profile;
  b. applying the virtual critic profile to the program guide information of the program guide to create program rating data associated with the virtual critic profile;
  c. ranking the program listings; and
  d. displaying the program listings in the program guide.

24. A video distribution system connectable to a client terminal that is in turn connected to a display device, the video distribution system provides program guide information to create a program guide that includes program listings displayable on the display device and a list of a plurality of different critic profiles based upon a plurality of critic rating sources, respectively, also displayable on the display device, the video distribution system comprising:
  a video distribution system controller,
  memory to store a ranking program and rating sources; and
  a preference engine to generate a critic profile based upon past program rating data associated with a critic rating source, the preference engine rating at least one program that does not have program rating data associated with the critic rating source;
  wherein, in response to user input selecting the critic profile from the list of different critic profiles received from the client terminal, the video distribution system controller responsive to the ranking program:
  a. ranks and orders program listings based upon the selected critic profile; and b. commands the client terminal to display the ranked and ordered program listings in the program guide on the display device.

25. The video distribution system of claim 24, wherein, the preference engine further creates a user profile based upon a user's viewing patterns.

26. The video distribution system of claim 25, wherein, in response to user input selecting a user profile, the video distribution system controller responsive to the ranking program applies the user profile to the program guide information to create program rating data associated with the user profile to rank and display the program listings in the program guide.

27. The video distribution system of claim 24, wherein, the preference engine further creates an aggregated user profile based upon a plurality of user profiles for a plurality of users, each user profile being based upon each user's viewing patterns.

28. The video distribution system of claim 27, wherein, in response to user input selecting an aggregated user profile, the video distribution system controller responsive to the ranking program applies the aggregated user profile to the program guide information to create program rating data associated with the aggregated user profile to rank and display the program listings in the program guide.

29. The video distribution system of claim 24, wherein, the preference engine further creates a virtual critic profile based upon program rating data associated with a plurality of critics from a plurality of different critic rating sources, respectively.

30. The video distribution system of claim 29, wherein, in response to user input selecting a virtual critic profile, the video distribution system controller responsive to the ranking program applies the virtual critic profile to the program guide information to create program rating data associated with the virtual critic profile to rank and display the program listings in the program guide.

* * * * *